United States Patent [19]

Kamhuber

[11] Patent Number: 4,684,793

[45] Date of Patent: Aug. 4, 1987

[54] DEVICE FOR ACQUIRING, STORING AND EVALUATING THE DATA OF A CHECKING PROCESS

[75] Inventor: Peter Kamhuber, Vienna, Austria

[73] Assignees: Erste Wiener Wach- und Schliessgesellschaft AG; "Niwe" Ing. Kamhuber & Co. KG, both of Vienna, Austria

[21] Appl. No.: 742,282

[22] Filed: Jun. 7, 1985

[30] Foreign Application Priority Data

Jul. 13, 1984 [AT] Austria .................................. 2282/84

[51] Int. Cl.⁴ .............................................. G06K 7/08
[52] U.S. Cl. ..................................... 235/449; 235/472
[58] Field of Search ................................. 235/449, 472

[56] References Cited

U.S. PATENT DOCUMENTS 4,258,253 3/1981 Fisher .................................. 235/449
4,345,146 8/1982 Story ................................... 235/449

Primary Examiner—Harold I. Pitts
Attorney, Agent, or Firm—Karl F. Ross; Herbert Dubno

[57] ABSTRACT

Device for acquiring, storing and evaluating the data of a checking process, comprising a data transmitter which is located at the site of the checking process, a mobile, portable data recording and storing device and a data evaluating device. The data transmitter (1) is formed by a magnetically codeable transmitter and the data acquisition and storage device is formed by a battery-operated device (2) which responds to magnetic signals and is associated with a data evaluating circuit (3,4).

6 Claims, 7 Drawing Figures

DEVICE FOR ACQUIRING, STORING AND EVALUATING THE DATA OF A CHECKING PROCESS

FIELD OF THE INVENTION

The invention relates to a device for acquiring, storing and evaluating the data of a checking process, comprising a data transmitter which is located at the site of the checking process, a mobile, portable data recording and storing device and a data evaluating device.

BACKGROUND OF THE INVENTION

According to the known state of the art, such a device for acquiring, storing and evaluating the data of a checking process can make use a so-called box key which is provided at the site of the checking process and which, after completion of the checking process, is inserted by the supervising person into a time clock carried by this person, which causes the time and the location of the checking process to be marked in the time clock. After completion of a plurality of checking processes, the data stored in the time clock can be evaluated in the required manner.

This known device is disadvantageous inasmuch as the number of different keys available for such a system is limited, which makes it possible, in a relatively simple manner, to tamper with the storage of the checking processes and to circumvent the marking system in the data acquisition device, for example for simulating checking processes.

OBJECT OF THE INVENTION

The object of the invention is to provide a device by means of which tampering and circumvention are eliminated and which also meets the special requirements of the business. In this connection, it is pointed out that the checkpoints can be provided not only inside buildings but also in the outdoor area of installation where the data transmitters are located by which a marking must be effected in the portable data acquisition and storage device, and that checking processes, as a rule, are carried out during the hours of the night, which is why the conditions of illumination are frequently bad.

SUMMARY OF THE INVENTION

According to the invention, the abovementioned objects are achieved when the data transmitter is formed by a magnetically codeable transmitter and when the data acquisition and strorage device is formed by a battery-operated device which responds to magnetic signals, contains an electronic storage circuit and is associated with an evaluating circuit.

The data transmitter is preferably formed by a carrier having an activatable magnetic coding and the portable data acquisition and storage device is constructed with a head which is provided with an activator for the magnetic coding and a sensor for the magnetic coding, the output of the sensor being applied to the electronic storage circuit. This eliminates the problem that the data transmitter coding can be improperly altered or that the coding can be erased. In this arrangement, the magnetically codeable transmitter can be formed by a bar of non-magnetic material, particularly plastic, which is provided with a coded coating of magnetizable material.

The bar is preferably used as a carrier for a foil which is provided at its surface associated with the bar with a coating of magnetizable material which forms the coding. The bar can be constructed with guides, for example grooves, which are associated in the head of the data acquisition and storage device with opposite equivalent guides, for example ribs.

In order to ensure reliable sensing, the head of the data acquisition and storage device can be mounted to be movable with respect to the latter, for example by means of stiff-elastic bellows. In addition, the activator and the sensor can be mounted to be movable in the head of the data acquisition and storage device.

Finally, in order to transmit in a simple manner the data stored in the data acquisition and storage device, the evaluating device can be constructed as comprising a recess which matches the external shape of the data acquisition and storage device, transmission heads which are associated with each other being arranged in both the data acquisition and storage device and in the evaluating device.

BRIEF DESCRIPTION OF THE DRAWING

In the text which follows, the invention is explained in greater detail with the aid of an illustrative embodiment shown in the drawing in which.

SPECIFIC DESCRIPTION

Figure 1A:
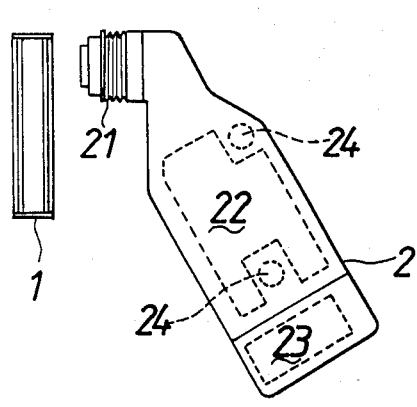
FIG. 1a is an elevational view a data transmitter and a data acquisition and storage device associated with the former.
Figure 1B:
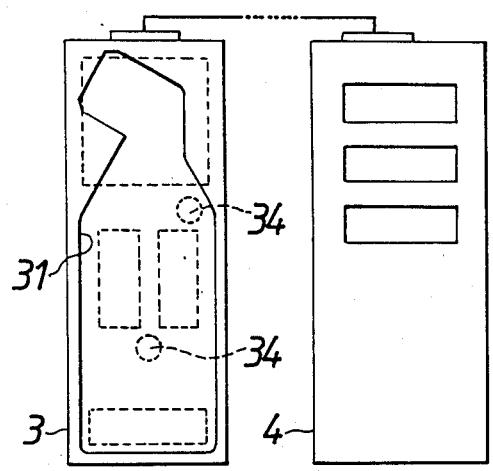
FIG. 1b is an elevational view which an evaluating device associated with the data acquisition and storage device.

As can be seen from FIGS. 1a and 1b, a device according to the invention for acquiring, storing and evaluating the data of a checking process consists of a data transmitter 1 which is located at the site of the checking process and the construction of which will be explained in greater detail in the text which follows, and of a mobile portable data acquisition and storage device 2 which is associated with the data transmitter, the size and external shape of which are selected to be such that it can be held one hand by a person and can be moved with its head along the data carrier 1. The data acquisition and storage device is associated with a data evaluating device which is formed of a transmission device 3 and of a data processing device 4.

The data transmitter 1 is located at the site at which a checking process has to be carried out. For marking or for determining the site at which the checking process has taken place and at which time it has been carried out, the head 21 of the data acquisition device 2 is moved along the strip-shaped data transmitter 1, which causes a storing process to take place in the latter by means of the electronics 22 provided in the acquisition and storage device 2. The electronics 22 are supplied by a battery 23 provided in this device 2. The data stored in the data acquisition and storage device 2 are transferred to a data evaluating device either by means of a transmitting system or they are transferred, after completion of a plurality of checking processes, to the data evaluating device 34 by the fact that the data acquisition and storage device 2 is coupled, for example inductively, to the data evaluating device 3, 4 which causes the data contained in the data acquisition and storage device 2 to be transferred to the data evaluating device 3, 4 and to be processed and, for example, printed out by the latter.

For this purpose, the data evaluating device can be formed, for example, of a transmission part 3 which has a recess 31 into which the data acquisition and storage device 2 can be inserted. For transmitting the data stored in the data acquisition device 2, this device 2 is constructed to comprise sound heads 24 which are associated in the transmission device 3 with corresponding read heads 34. The signal data reaching the transmission device 3 are subsequently fed to the evaluating part 4 which causes these data to be processed and, for example, to be printed out.

Figure 2:
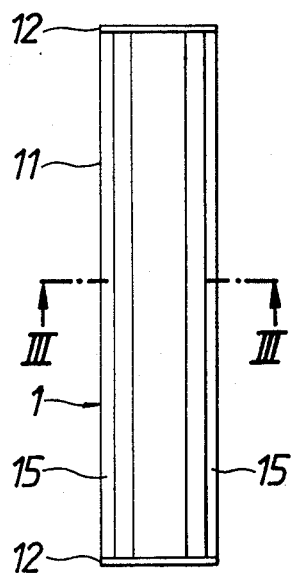
FIG. 2 is an elevational view of the data transmitter of FIG. 1 in enlarged representation.
Figure 3:
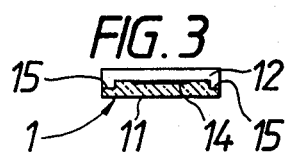
FIG. 3 is a section through the data transmitter along line III—III of FIG. 2.

As can be seen from FIGS. 2 and 3 of the drawing, the data transmitter 1 consists, for example, of a bar 11 made of plastic, which is constructed at its ends to comprise stops 12. At its top 11 it is constructed to comprise an adhesive foil 14 which is provided underneath, that is to say at its side facing the bar 11, with a magnetically activatable coding, for example in the form of a bar code of ferromagnetic material. Along its two side walls, the bar is constructed to comprise grooves 15 which are used for guiding the head 21 of the data acquisition and storage device 2.

Figure 4:
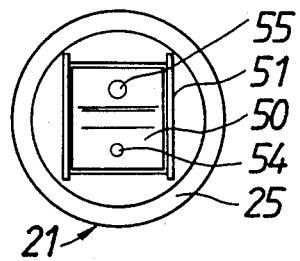
FIG. 4 is a top view of the head of the data transmitter of FIG. 1, in enlarged representation.
Figure 5:
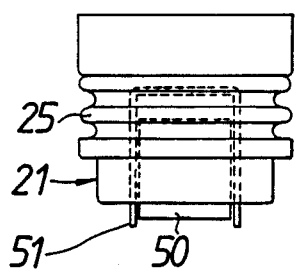
FIG. 5 shows a side view of the head of the data transmitter of FIG. 1 in enlarged representation.
Figure 6:
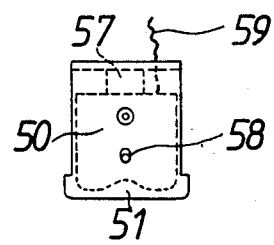
FIG. 6 shows a detail of the head of the data transmitter.

As can also be seen from FIGS. 4 and 5, the head 21 of the data acquisition and storage device is connected to the main part of the device 2 by means of stiff-elastic bellows 25 which are manufactured, for example, from stiff-elastic plastic. This causes the head 21 to be slightly movable with respect to the main part of the device 2. In the head 21, a bracket 51 is provided as carrier for an insert 50. The insert 50 is constructed to comprise an activator 54 for the magnetic coding and a sensor 55. The free ends of the bracket 51 form projecting bars which correspond to and ride in the lateral grooves 15 of the data transmitter 1. The insert 50 is slightly movable against the action of a spring 57 in the U-shaped bracket 51, this movability being limited by pins 58 which protrude laterally from the insert 50 and which protrude into the elongated holes provided in the legs of the bracket 51. The activator 54 is preferably formed by a permanent magnet.

The signals picked up by the sensor are transferred by means of a line 59 to the electronics 22. The head 21 is sealed to be watertight with respect to the housing of the data acquisition and storage device 2. Finally, an optical and/or acoustical indicator is provided at the device 2, which indicates that the device 2 is operating correctly.

As explained above, the data transmitter 1, due to its bar code, is provided with a magnetically activatable coding which can neither be altered nor erased. As soon as the head 21 of the data acquisition and storage device 2 is moved in a predetermined direction along the data transmitter 1, being guided by means of the free ends of the legs of the bracket 51 in the grooves 15 of the data transmitter 1, the coding formed by the magnetizable coating is activated by means of the permanent magnet 54 provided in the head 21 of the data aquisition and storage device 2. The coding is picked up by the sensor 55, which is located behind the latter in the direction of movement and is transferred via line 59 to the electronics 22 provided in the data acquisition and storage device 2, where it is stored. In addition, a timer provided in the electronics 22 marks in each case the beginning and possibly also the end of the data acquisition process.

After completion of a plurality of such acquisitions of checking processes, the values stored in the electronics 22 are transferred and subsequently evaluated, as has been explained with the aid of FIG. 1b.

What is claimed is:

1. A checking apparatus, comprising:
    a data transmitter forming one of a plurality of such transmitters disposed at fixed locations to be checked, each of said data transmitters having an elongated track magnetically encoded with data in a magnetically activatable form specific to the respective location and arrayed along the respective track;
    a portable data-acquisition device formed with a head shiftable along the tracks of said data transmitters and including:
        a magnetic-field generator in said head for magnetically activating the magnetic coding arrayed along each track upon shifting of said head therealong in a given direction,
        a code detector in said head behind said magnetic-field generator with respect to said direction for detecting the respective code, and
        a battery-powered electronic storage connected to said code detector for storing electrical signals represented by the code detected by said code detector; and
    a data-evaluating device operatively couplable with said portable data-acquisition device for transfer of data represented by the electrical signals stored in said storage for evaluating said data.

2. The checking apparatus defined in claim 1 wherein said data transmitter comprises a bar of a nonmagnetic synthetic resin material formed with a coating which is composed at least in part of magnetizable material to form a coded layer thereon.

3. The checking apparatus defined in claim 2 wherein said bar is provided with a pair of guide grooves flanking a foil formed with said coating and said head is provided with a pair of parallel ribs engageable in said grooves for guiding movement of said head along the track formed by said data transmitter.

4. The checking apparatus defined in claim 3 wherein said data acquisition device further comprises a body containing said battery-powered electronic storage and connected with said head by a bellows forming a stiff but elastic coupling sealingly joining said head with said body.

5. The checking apparatus defined in claim 4 wherein said magnetic-field generator and said code detector are mounted on a common support which is displaceable in said head against a spring force.

6. The checking apparatus defined in claim 5 wherein said data evaluating device is formed with a recess having a configuration complementary to that of said data-acquisition device whereby said data acquisition device can be inserted in said recess for said transfer of data.

* * * * *